(No Model.)
J. W. MARK.
GLASS FOR LIGHT TRANSMITTING AND VENTILATING.
No. 458,854. Patented Sept. 1, 1891.
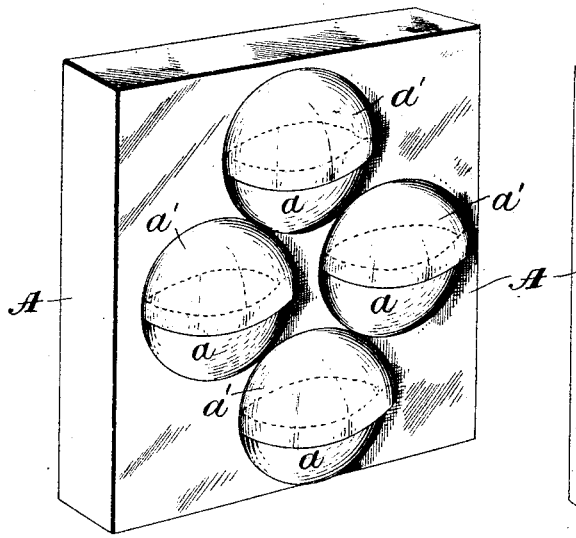
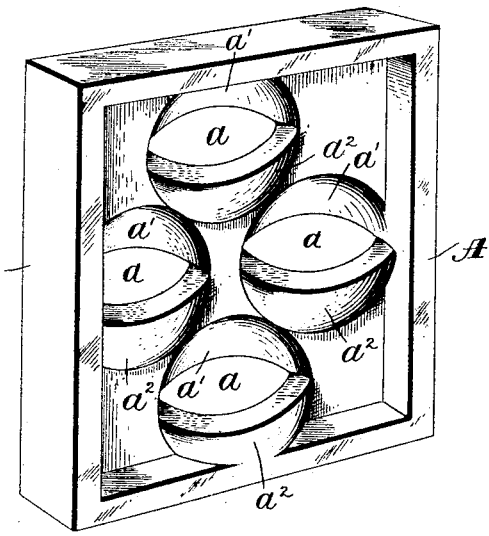
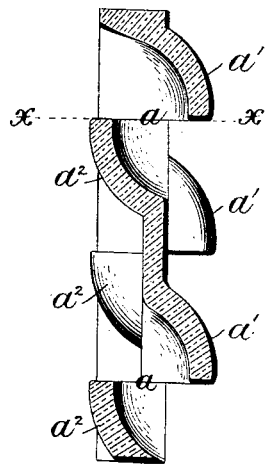
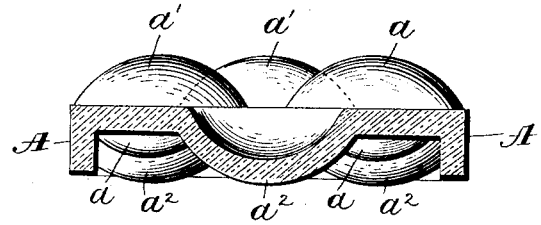
Witnesses:
Jas. E. Hutchinson.
Henry C. Hazard.
Inventor.
John W. Mark, by
Prindle and Russell his Attys.

UNITED STATES PATENT OFFICE.

JOHN W. MARK, OF NEW YORK, N. Y.

GLASS FOR LIGHT-TRANSMITTING AND VENTILATING.

SPECIFICATION forming part of Letters Patent No. 458,854, dated September 1, 1891.

Application filed April 21, 1891. Serial No. 389,820. (No model.)

*To all whom it may concern:*

Be it known that I, JOHN W. MARK, of New York, in the county of New York, and in the State of New York, have invented certain new and useful Improvements in Glasses for Light-Transmitting and Ventilating Purposes; and I do hereby declare that the following is a full, clear, and exact description thereof, reference being had to the accompanying drawings, in which—

Figures 1 and 2 are perspective views of my glass from opposite sides; Fig. 3, a vertical section thereof, and Fig. 4 a horizontal section on the line *x x* of Fig. 3.

Letters of like name and kind refer to like parts in each of the figures.

The design of my invention is to construct a glass for use in the risers of outdoor or exposed stairways or in other vertical or upright situations, having provision for ventilating purposes, which, while affording adequate admission or passage of air, will nevertheless not permit the entrance of rain or snow into the space or compartment to be illuminated and ventilated.

To this end said invention consists in the glass constructed substantially as hereinafter specified.

As shown in the drawings, my improved glass consists of a preferably rectangular or square plate or sheet A, in which are four similarly-shaped ventilating or air apertures *a a a a*. Each of these is formed by projecting from the opposite sides of the plate A convexo-concave protuberances or offsets $a'$ and $a^2$, the former being on what in use is the outer or exposed side and the latter on the inner side. In shape these protuberances or offsets are the section or part of a hollow sphere, being substantially one-quarter thereof, and their position relative to each other corresponds to that of the diagonally-opposite quarters of a sphere, the outer one $a'$ being in the higher plane and with its lower edge preferably in the same horizontal plane as the upper edge of the offset $a^3$. The apertures *a* are defined or bounded by the inner concave faces of the upper offsets $a'$ and the outer concave faces of the lower offsets $a^2$, and in view of the relative positions of these concave faces may, broadly speaking, be considered as openings or passages extending obliquely through the plate of glass; or, to describe them differently, each may be considered as composed of two triangular-shaped cavities opening in both a horizontal and a vertical plane.

The shape which I have given the protuberances or offsets is most advantageous, as it enables the formation of openings of considerable area without incurring any likelihood of inward passage of rain. The latter is particularly well guarded against by having the edges of the offsets that stand away from the surface of the glass in the same horizontal plane, and this construction also prevents the direct passage of strong drafts of air.

I have shown my ventilating devices as arranged on the two diameters of the glass A in pairs and "dodged" or "staggered;" but of course, if desired, they may be differently located and relatively arranged and more or less than four be provided in one glass.

Having thus described my invention, what I claim is—

1. A glass for illuminating and ventilating purposes, having a hollow protuberance or offset standing away from its surface and forming a laterally and downwardly opening aperture, the part of said offset bounding or defining the downwardly-opening portion of said aperture being in such a plane that none of it is above the laterally-opening portion of the aperture, substantially as and for the purpose specified.

2. A glass for illuminating and ventilating purposes, having an opening housed by an overhanging portion whose lower edge is a straight or substantially straight line in a horizontal plane, substantially as and for the purpose set forth.

3. A glass having an aperture formed by a convexo-concave protuberance or offset whose lower edge extends in a horizontal or substantially horizontal line, substantially as and for the purpose shown.

4. A glass having an aperture formed by two offsets diagonally and reversely arranged, the lower edge of the upper one being in the same plane as the upper edge of the lower one and each containing a cavity, substantially as and for the purpose described.

5. A glass for illuminating and ventilating purposes, consisting of a plate having an aperture formed by two convexo-concave offsets disposed one on the outer and one on the inner side of said plate, the outer one being in the higher plane, substantially as and for the purpose set forth.

6. A glass for illuminating and ventilating purposes, consisting of a plate having an aperture formed by two convexo-concave offsets disposed the one on the outer and one on the inner side of said plate, the lower edge of the outer offset standing away from the surface of the plate and the upper edge of the inner offset likewise standing away therefrom and the said edges being in the same horizontal plane, substantially as and for the purpose shown and described.

7. A glass for illuminating and ventilating purposes for use in vertical situations, consisting of a rectangular plate having a number of apertures formed each by two reversely-arranged convexo-concave offsets disposed the one on the outer and one on the inner side of said plate, the former being in the higher plane, substantially as and for the purpose specified.

In testimony that I claim the foregoing I have hereunto set my hand this 16th day of April, 1891.

JOHN W. MARK.

Witnesses:
GEORGE SCHUCHMAN,
CHAS. HINMETSBACH.